United States Patent [19]

Raidel

[11] Patent Number: 4,714,269
[45] Date of Patent: Dec. 22, 1987

[54] WIDE BASE TYPE SUSPENSION ASSEMBLY WITH PARALLELOGRAM TORQUE BEAMS AND FOUR AIR SPRINGS

[76] Inventor: John E. Raidel, Rt. 1, Box 400-M, Springfield, Mo. 65804

[21] Appl. No.: 931,808

[22] Filed: Nov. 18, 1986

[51] Int. Cl.⁴ .......................... B60G 3/16; B60G 11/26
[52] U.S. Cl. .................................... 280/683; 280/702; 280/700; 280/721
[58] Field of Search ............... 280/683, 688, 702, 709, 280/679, 700, 717, 721

[56] References Cited

U.S. PATENT DOCUMENTS

| | | | |
|---|---|---|---|
| 3,147,024 | 9/1964 | Brockman | 280/683 |
| 4,047,736 | 9/1977 | Prive et al. | 280/683 |
| 4,162,799 | 7/1979 | Willetts | 280/683 |
| 4,397,473 | 8/1983 | Miles et al. | 280/683 |
| 4,500,112 | 2/1985 | Raidel | 280/702 |

*Primary Examiner*—Richard A. Bertsch
*Attorney, Agent, or Firm*—Rogers, Howell, Moore & Haferkamp

[57] ABSTRACT

A vehicle suspension system having a longitudinally extending beam assembly with a medial section connected to the vehicle axle, a forward end that provides a spring seat for a front air spring, and a rearward end that provides a spring seat for a rear air spring. The air springs are outriggered by mounting brackets that project outboard of the beam assembly. Upper outboard projecting mounting brackets are connected to the vehicle chassis. The beam assembly has a special stepped configuration to avoid interference with existing vehicle components while providing the desired distribution of loads between the air springs. The suspension system incorporates two air springs and two shock absorbers on each side of the vehicle. A parallelogram is provided by upper and lower torque rods. The lower torque rod is of large cross section to provide increased strength and to allow for mounting on large heavy-duty bushings so that the torque rod can transfer push and pull loads. The parallelogram arrangement between the upper and lower torque rods provides axle stability.

7 Claims, 5 Drawing Figures

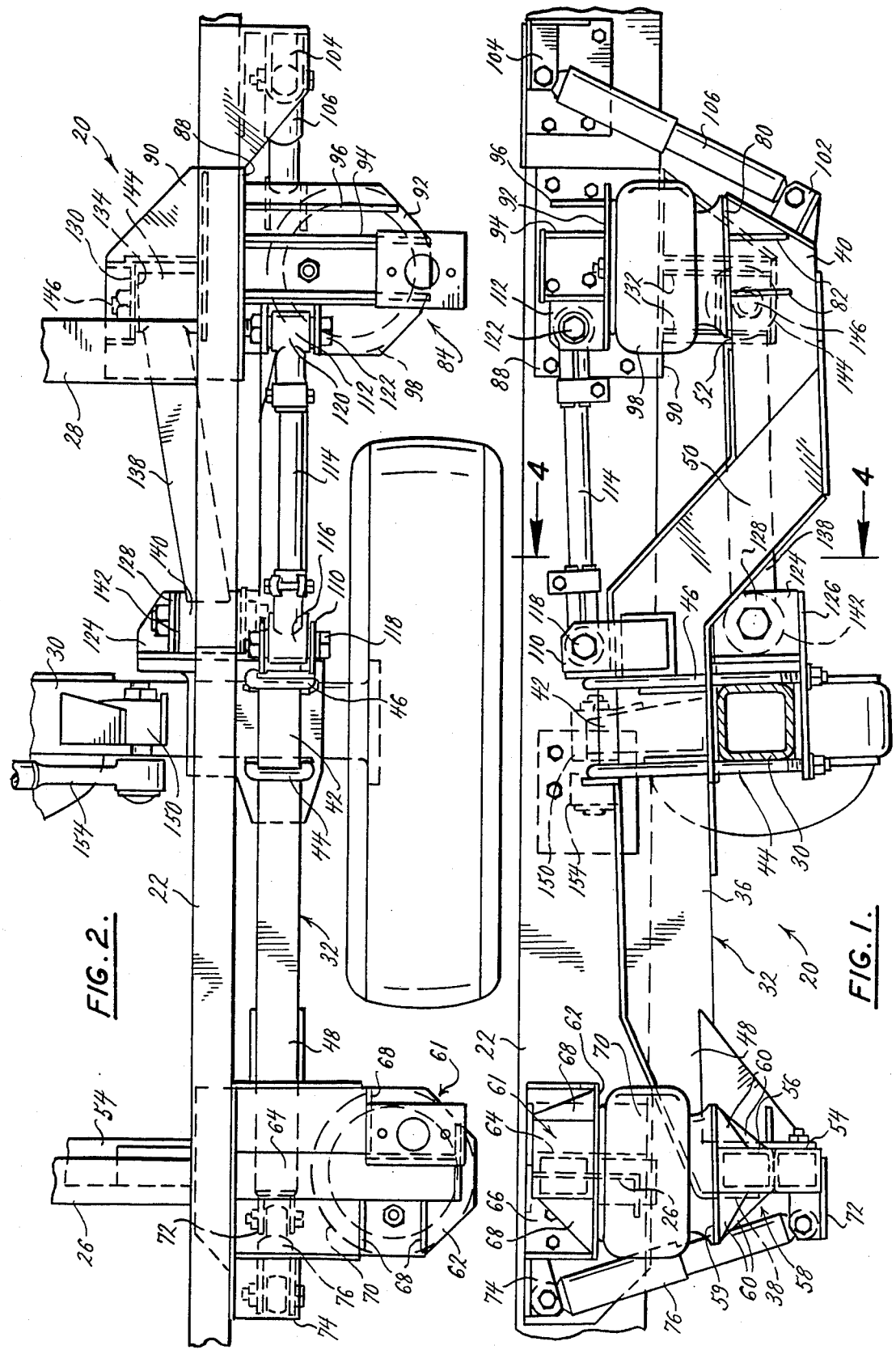

WIDE BASE TYPE SUSPENSION ASSEMBLY WITH PARALLELOGRAM TORQUE BEAMS AND FOUR AIR SPRINGS

BACKGROUND OF THE INVENTION

This invention relates to a wide base type suspension assembly having parallel torque beams and incorporating four air springs and four shock absorbers on each side of the vehicle.

Some of the components and features of this invention are known. For example, it is known to provide a wide base suspension wherein the springs are supported on brackets in outrigger fashion. It is also known to provide a parallelogram arrangement for stabilizing a vehicle axle, and the provision of a sway bar is known. However, as the description of the invention will confirm, the various components with their particular design and the combination of them is not known in the prior art. In particular, no prior art suspension system has a configuration to accommodate the vehicle components such as does the present invention, nor does it incorporate the special torque rod arrangement while preserving a parallelogram orientation while providing two air springs and two shock absorbers out of interference with one another.

SUMMARY OF THE INVENTION

This suspension system incorporates a beam assembly on each side of the vehicle. The beam assembly includes a longitudinal medial section that is connected to the vehicle axle. Forward of the medial section, the beam assembly has a short downwardly inclined section leading to a front end. A cross member is connected between the front end of the beam assembly and the front end of a like beam assembly on the other side of the vehicle.

The medial section extends forwardly a distance sufficient to clear existing vehicle components, such as a brake chamber that is in front of the vehicle axle. Immediately rearward of the axle, there is a step-down section on the beam assembly leading to a generally horizontal rear end of the beam assembly. Transversely outboard projecting brackets are mounted on the front and rear ends of the beam assembly and transversely outboard projecting brackets are mounted on the frame rail of the chassis. Front and rear air springs are mounted between these brackets.

Between the front of the beam assembly and the chassis there is a shock absorber. Likewise, a rear shock absorber is mounted between the chassis and the rear end of the beam assembly. A special parallelogram arrangement is provided by upper and lower torque rods. The lower torque rod is of heavy-duty construction to provide push and pull force transmission. Because it is large, the lower torque rod can also accommodate larger heavy duty bushings at its mounting points. A sway bar controls sway of the chassis relative to the axle.

BRIEF DESCRIPTION OF THE DRAWINGS

FIG. 1 is a side elevation view of the suspension system;

FIG. 2 is a top plan view of the suspension system;

DETAILED DESCRIPTION OF THE PREFERRED EMBODIMENT

Figure 5:
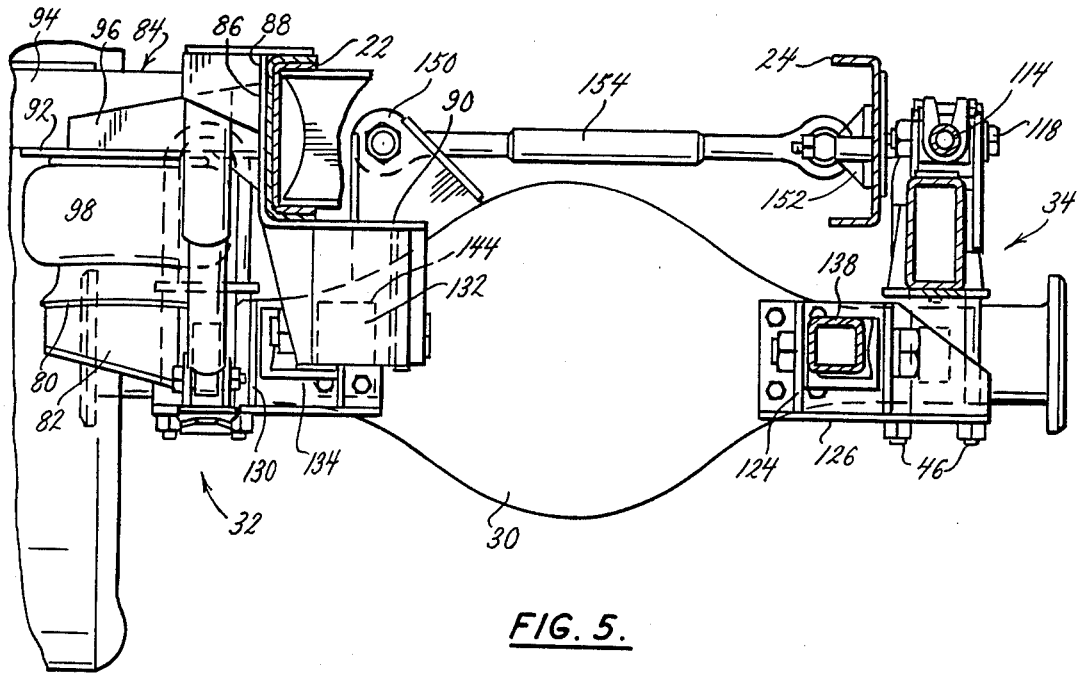
FIG. 5 is a rear elevation view of the suspension system as viewed from the right of FIG. 1 and with portions shown in section.

This suspension system 20 is used on a vehicle that has a chassis with left and right frame rail members 22 and 24 and with cross members 26 and 28 extending between the frame rails 22 and 24. An axle 30 is located below the frame rails 22 and 24. Except for the sway bar that will be described, the suspension system includes components on the left side of the vehicle that are identical to components on the right side of the vehicle. Therefore, both will not be described and for convenience, the components on the left of the vehicle will be des- cribed.

Figure 4:
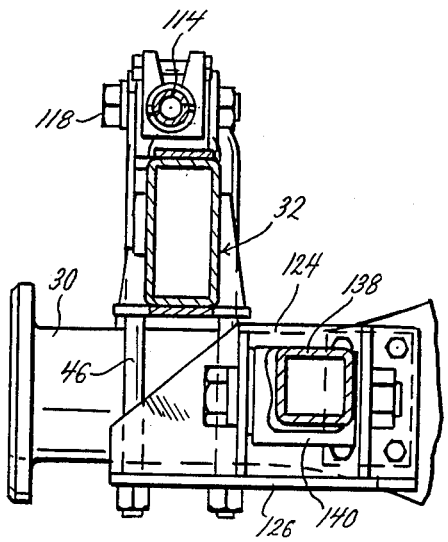
FIG. 4 is a view in section taken along the plane of line 4—4 of FIG. 1.

The suspension system 20 includes left and right substantially identical beam assemblies 32 and 34, preferably of rectangular tubular cross section as shown in FIGS. 4 and 5. The beam assemblies 32 and 34 are located below and outboard of the frame rails 22 and 24. The beam assembly 32 has a longitudinal medial section 36 between a forward end 38 and a rearward end 40. A pad 42 is positioned above the medial section 36 and the pad 42 together with the medial section 36 are connected to the axle 30 by a pair of U-bolts 44 and 46.

The vehicle has a brake chamber (not shown) forward of the axle 30 and the longitudinal medial section 36 extends forward of the axle 30 a sufficient distance to clear the brake chamber. From there, the beam assembly 36 has a downwardly and forwardly inclined section 48 terminating in the forward end 38. Immediately rearward of the axle 30, the beam assembly 32 has a rearwardly and downwardly inclined step down section 50 leading to the rearward end 40 that comprises a generally longitudinal section with an upper face 52.

Extending transversely between the beam assemblies 32 and 34 and connected to the front ends thereof is a cross member 54. As shown in FIG. 1, the cross member 54 hangs below the front ends 38 of the beam assemblies 32 and 34 and a reinforcing second tubular member 56 is welded to the top of the cross member 54.

The cross member 54 and the second tubular member 56 are welded to the front end 38 of the beam assembly 32 and extend transversely outboard therefrom to provide an outboard lower spring seat section 58. A plate 59 is welded to the upper side of the spring seat section 58 and is reinforced by gussets 60.

An upper forward spring seat assembly 61 includes a horizontal plate 62 with a transverse reinforcing beam 64 welded to its upper surface. The plate 62 and beam 64 are welded to a back plate 66 by which the spring seat assembly 61 is joined to the frame rail 22. There are reinforcing gussets 68 between the reinforcing beam and the plate 62. A front air spring 70 is mounted between the plate 59 on the lower spring seat section 58 and the plate 62 on the upper spring seat assembly 61.

Figure 3:
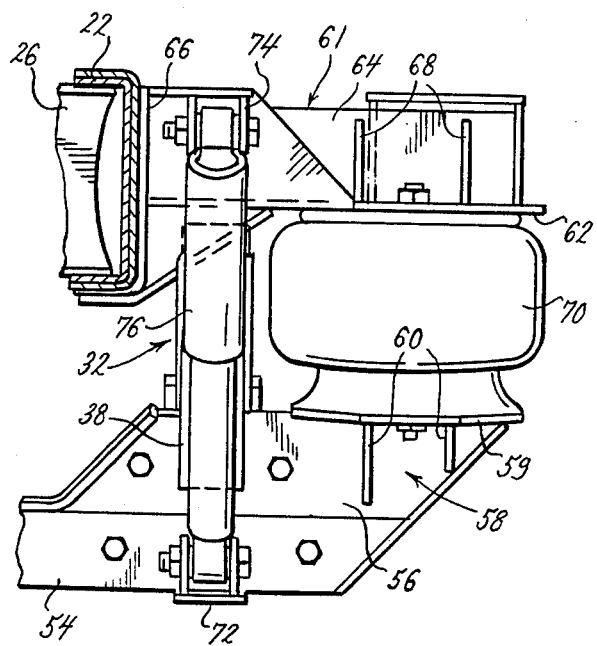
FIG. 3 is a front elevation view of the suspension system as viewed from the left of FIG. 1.

A lower shock absorber bracket 72 is welded to the lower spring seat section 58 and an upper shock absorber bracket 74 is welded to the upper spring seat assembly 61. The respective ends of a shock absorber 76 are pivotally connected to the brackets 72 and 74 as shown in FIG. 3. As also shown in FIG. 3, the lower spring seat section 58 and the upper spring seat assembly 61 extend outboard a sufficient distance to allow the air spring 70 to be mounted in a position clear of the shock absorber 76.

At the rear end 40 of the beam assembly 32, a lower spring seat plate 80 is welded to the upper face 52 of the end section 40. The spring seat plate 80 projects laterally outboard, as shown in FIG. 5, and is supported by reinforcing gussets 82. A rear upper spring seat assembly 84 includes a plate 86 having a vertical section 88 and a lower horizontal inboard section 90, respectively, wrapped about the side and bottom of the frame rail 22, as shown in FIG. 5. The upper rear spring seat assembly 84 also includes a horizontal plate 92 extending outboard from the plate 86 and reinforced by a fabricated outwardly extending beam member 94 and by a gusset 96. A rear air spring 98 is mounted between the plate 80 and the plate 92.

A lower shock absorber bracket 102 is connected to the rear end 40 of the beam assembly 32, and an upper shock absorber bracket 104 is connected to the frame rail 22. A rear shock absorber 106 is pivotally connected between the brackets 102 and 104. It will be observed that the shock absorber 106 is to the rear of the rear air spring 98 and away from interference with it. As can be seen in FIG. 2, the shock absorbers 76 and 102 are aligned with the beam assembly 32 in a longitudinal direction to make them more effective in operation.

A forward upper torque rod bracket 110 is welded to the medial section 36 of the beam assembly immediately to the rear of the U-bolt 46. A rearward torque rod bracket 112 is welded to the side of the beam assembly 94 as shown in FIGS. 1 and 2. An upper torque rod 114 has its forward end 116 journalled on a bushing 118 that is mounted in the forward bracket 110 and has a rearward end 120 journalled on a bushing 122 that is mounted in the rear torque rod bracket 112. The brackets 110 and 112 are so located that the torque rod 114 is positioned immediately above and generally aligned with the beam assembly 32.

A lower forward torque rod bracket 124 is connected by its plate 126 to the U-bolts 44 and 46. The bracket 124 includes a mounting section 128 located to the rear and inboard of the U-bolts 44 and 46, as shown in FIG. 2. A lower rear torque rod mounting bracket 130 includes vertical plates 132 by which it is joined to the horizontal plate section 90 of the plate 86 that is connected to the frame rail 22 (see FIG. 5).

The lower torque rod bracket 130 has a torque rod connecting section 134 located inboard of the frame rail 22, as shown in FIG. 2. A lower torque rod 138 has a relatively large square-tube cross section as shown in FIG. 4 and has a forward end 140 journalled on a large bushing 142 that is mounted in the forward lower torque rod bracket 124 and a rearward end 144 journalled on a large bushing and eccentric bolt assembly 146 supported by the rear lower torque rod bracket 130. This large torque rod 138 with its large and heavy-duty bushings 142 and 144 can transfer both push and pull forces during operation of the vehicle. The bushing and eccentric bolt assembly 146 provide for axle alignment in a manner known in the art.

A sway bar mounting bracket 150 is welded to the axle 30, as shown in FIG. 5. Another sway bar mounting bracket 152 is connected to the opposite frame rail 24. A sway bar 154 is pivotally connected between the sway bar mounting brackets 150 and 152.

OPERATION

This suspension system is particularly adapted and suitable for installation on a vehicle having a rear engine. The suspension system is so designed that all of the components of the vehicle can be left intact and in place. The beam assembly 32 is especially designed to accommodate existing vehicle components without interference and yet provide a wide base mount for two outboard air springs and to distribute loads to those springs. The heavy lower torque rod 50 and its heavy duty bushings 128 and 146 transfer push and pull loads during operation of the vehicle. Even though the lower torque rod 138 is located inboard and at an angle to the longitudinal axis, it nevertheless cooperates with the upper torque rod 114 to provide a longitudinal parallelogram configuration that stabilizes the axle 30. The cross member 26 provides transverse stability between the beam assemblies 32 and 34 while transferring some of the vertical load from one side of the vehicle to the other.

The two shock absorbers 76 and 106 are in line with the beam assembly 32 and therefore work effectively to absorb shocks while the outrigger locations of the front and rear air springs 70 and 98 increase ride comfort.

There are various changes and modifications which may be made to the invention as would be apparent to those skilled in the art. However, these changes or modifications are included in the teaching of the disclosure, and it is intended that the invention be limited only by the scope of the claims appended hereto.

What I claim is:

1. A vehicle suspension system for a vehicle having a chassis that includes a longitudinally extending frame rail member and an axle spaced below the frame rail member, comprising a longitudinally extending beam assembly having forward and rearward ends and a medial section therebetween, means to connect the medial section to the axle at a location that positions the beam assembly below and outboard of the frame rail member, a front air spring and a rear air spring, means to support the bottom of the rear air spring from the rearward end of the beam assembly, means to support the top of the rear air spring from the frame rail member, means to support the bottom of the front air spring from the forward end of the beam assembly, means to support the top of the front air spring from the frame rail member, an upper torque rod having a forward end and a rearward end, a lower torque rod having a forward end and a rearward end, front bracket means supported by the medial section of the beam assembly and having upper and lower connectors, the lower connector being positioned inboard of the upper connector and of the beam, rear bracket means supported by the frame rail member at a location adjacent the rear air spring and having upper and lower connectors, the lower connector of the rear bracket means being positioned inboard of the upper connector of the rear bracket means, bushing means to pivotally connect the forward and rearward ends of the upper torque rod to the upper connectors of the front and rear bracket means respectively, and relatively large bushing means to pivotally connect the forward and rearward ends of the lower torque rod to the lower connectors of the front and rear bracket means respectively to provide a longitudinal parallelogram defined by the torque rods, the lower torque rod being substantially larger in cross-sectional area than the upper torque rod to accomodate the relatively large bushing means and to provide push and pull force transmission through the lower torque rod.

2. The vehicle suspension system of claim 1 wherein the medial section of the beam assembly overlies and is connected to the axle in an overslung manner and extends forward of the axle to clear and avoid interfering with vehicle components below the medial section, and the beam assembly has front and rear sections connected to the medial section by drop sections that position the forward and rearward ends of the beam assembly below the medial section.

3. The vehicle suspension system of claim 1 including front and rear shock absorbers, means to connect the front shock absorber between the frame rail member and the forward end of the beam assembly, and means to connect the rear shock absorber between the frame rail member and the rearward end of the beam assembly.

4. The vehicle suspension system of claim 1 including a transverse cross beam connected to and extending between the beam assembly and a like beam assembly on the opposite side of the vehicle, the outrigger support means including a section of the cross beam projecting transversely outboard of the beam assembly and including additional beam means superimposed on the cross beam section to strengthen the outrigger support means, means to connect the bottom of the front air spring to and for support by the cross beam section and the additional beam means.

5. A vehicle suspension system for a vehicle having a chassis that includes left and right frame rail members and an axle below the frame rail members, comprising substantially identical left and right beam assemblies each having forward and rearward ends, each beam assembly having a longitudinally extending medial section overlying the axle, means for connecting the medial section to the axle, a cross member connected to and extending between the forward ends of the frame rail members and having sections extending transversely outboard of the frame rail members, means to mount an upper spring seat supported by and projecting outboard of each frame rail member, a front air spring mounted between each cross member section and corresponding upper forward spring seat, the medial section of each beam assembly being elongated and extending forwardly to a position immediately rearward of the front air spring to provide clearance for vehicle components below the medial sections and between the axle and the front air springs, the beam assembly including a stepdown section between the axle and the rearward end of the beam assembly to provide a lowered rearward end, a bracket mounted to the outboard side of the rearward end of each beam assembly and projecting outboard therefrom, a rear spring seat connected to the outboard side of each frame rail member and extending outboard therefrom, a rear air spring mounted between each bracket and corresponding rear spring seat, and upper and lower torque rods connected between each beam assembly and corresponding frame rail in a parallelogram orientation.

6. The vehicle suspension system of claim 5 wherein the cross member comprises a beam having a flat upper side and each section of the cross member comprises an extension of the cross member and a tubular member having a flat lower side in contact with and welded to said flat upper side, the cross member extension and the tubular member extending outboard from the area of connection to the beam assembly for increased strength to support the front air spring.

7. The vehicle suspension system of claim 10 wherein the means to connect the medial section to the axle comprises U-bolts, a torque rod bracket including a plate connected to the axle by the U-bolts and having a plate portion located inwardly and rearwardly of the U-bolts, means supported by the plate portion for pivotal connection to the lower torque rod, a bracket connected to and projecting upwardly from each medial section of the beam assembly for pivotal connection to the upper torque rod, one rear spring seat having a top plate extending inward of the corresponding frame rail, a sway bar, means to pivotally connect an end of the sway bar to the top plate, and means to pivotally connect the other end of the sway bar to the other frame rail.

* * * * *